May 29, 1923.  1,456,955
C. F. WAGNER
MEANS FOR OBTAINING HIGH MOMENTARY CURRENT
Filed Feb. 26, 1921
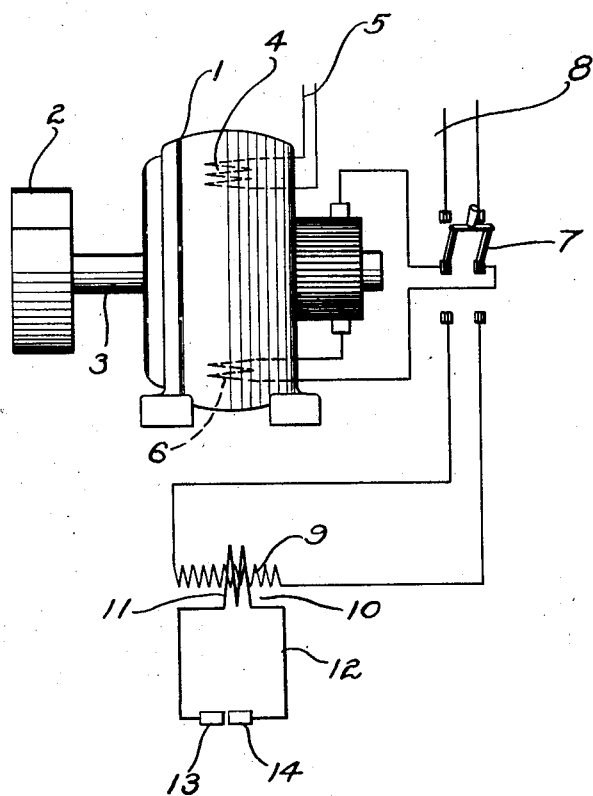
WITNESSES:
INVENTOR
Charles F. Wagner.
BY
ATTORNEY Patented May 29, 1923.

1,456,955

UNITED STATES PATENT OFFICE.

CHARLES F. WAGNER, OF PITTSBURGH, PENNSYLVANIA, ASSIGNOR TO WESTINGHOUSE ELECTRIC & MANUFACTURING COMPANY, A CORPORATION OF PENNSYLVANIA.

MEANS FOR OBTAINING HIGH MOMENTARY CURRENT.

Application filed February 26, 1921. Serial No. 448,238.

*To all whom it may concern:*

Be it known that I, CHARLES F. WAGNER, a citizen of the United States, and a resident of Pittsburgh, in the county of Allegheny and State of Pennsylvania, have invented a new and useful Improvement in Means for Obtaining High Momentary Current, of which the following is a specification.

My invention relates to means for obtaining a momentary electric current of large volume that shall be especially adapted for electro-percussive welding machines.

In electric welding processes for welding together bodies of either like or unlike metal, it is necessary to provide a large electric current for a short time. Generally the larger the current the less time is consumed in making the weld, and, in some instances, a very large momentary current is essential to obtain a good weld.

One commonly used method for joining two bodies of like or unlike metals by welding consists in clamping the members into engagement with each other and passing electric current through the junction until the members become fused together.

For some metals, such as aluminum, the electro-percussive process is more satisfactory. This method consists in clamping the members to be welded in suitable holders in alinement with each other, the terminals of said holders being connected to a generator having a condenser connected across the line. The bodies are brought into percussive engagement to close the circuit and cause a momentary current to pass therethrough. The simultaneous dissipation of the mechanical and electrical energy results in a uniform welding of the contacting surfaces. The momentary large current in this case is provided by the discharge of the condenser connected across the generator circuit.

Another method of producing large momentary currents consists in connecting a transformer in the welding circuit, the primary winding of which is connected to a source of alternating current and the secondary winding to the members to be welded. The current induced in the secondary winding, when short circuited across the members, welds them together. The disadvantage of this method is that an excessively large generating unit is necessary to produce the large currents for welding.

My invention provides a means for supplying momentary large currents from a suitable source when the engagement of the members to be welded takes place, and it is among the objects thereof to provide an efficient and inexpensive source of power particularly adapted for use in combination with electro-percussive welding apparatus.

Another object of my invention is to provide an apparatus suitable for generating momentary large electric currents from any convenient source of electrical energy of relatively low current value.

In practicing my invention, I provide a direct-current motor which may be used as a generator. I mount a flywheel on one end of the motor shaft and connect the commutator brushes thereof to a double-pole, double-throw switch which may be closed to form a circuit with either a source of electrical energy or the primary winding of a transformer, the secondary of which is connected to the terminals of the holder in which the bodies to be welded are clamped. The flywheel is accelerated at any desired rate by connecting the double-throw switch to the source of electrical energy to actuate the motor, and, when the desired speed is attained, the switch is connected to the welding-current circuit to cause the motor to operate as a generator, thus building up a magnetic field in the primary windings of the transformer. The secondary circuit is then closed by bringing the members to be welded into percussive engagement with each other, and the primary is simultaneously opened, causing a momentary large current to flow in the secondary. A momentary arc is thus drawn between the welding members, fusing their surfaces, which are welded together by the percussive blow. If the constants of the electric circuit so formed are satisfactory, the current drawn will be very large. It is analogous to throwing an inductive short circuit on the generator.

In the accompanying drawing, forming a part hereof and in which like reference characters designate like parts, The single figure is a diagrammatic view of an apparatus for generating a large momentary current in accordance with my invention.

I provide a motor 1 having a flywheel 2 mounted on a shaft extension 3 thereof, and a separately excited shunt field winding 4 on said motor 1 is connected to an independent source 5 of electrical energy. The motor is further provided with a series field winding 6 and is connected to a two-pole, double-throw switch 7 which may be connected to a source of current 8 or to the primary winding 9 of a transformer 10 which links with the secondary winding 11 of the welding circuit 12 including the conductors 13 and 14 to be welded together.

The operation of my apparatus is briefly as follows:

The motor 1 is actuated by connecting the switch 7 to the source of current 8, thereby accelerating the flywheel 2 which stores up energy. The switch 7 is then connected to the transformer circuit 9 and the motor operating as a generator with the aid of the series field 6 quickly robs the flywheel of its energy, changing it to electromagnetic energy in the primary windings 9 of the transformer 10. When the current in the primary circuit has attained its maximum value, the secondary windings 11, which are interlocked with the primary windings, are closed by causing the members 13 and 14 to come into percussive engagement. The primary circuit is opened simultaneously, causing the energy therein to be transformed into current flowing in the secondary circuit. An arc is thus drawn between the members 13 and 14 to be welded and the surfaces thereof are welded together by the percussive blow.

From the above description of my invention, it is evident that my means for providing a large momentary current from a source of electrical energy is very simple and efficient. An important advantage lies in the use of a relatively small generating unit which may be operated from ordinary voltage circuits to store up kinetic energy in the flywheel at a slow rate, which may be readily and instantaneously transformed into electromagnetic energy, giving a large welding current.

Although I have described a specific embodiment of my invention, it will be obvious that various modifications may be made within the scope thereof without departing from the principles herein set forth. For instance, similar results may be obtained by dispensing with the series winding of the motor, or the shunt field winding may be directly connected to the primary source of energy used for actuating the motor, or I may utilize such apparatus as a source of electrical energy to charge condenser units placed in a welding circuit.

I claim as my invention:—

1. In combination with a percussive welding apparatus, means for storing up energy, and means for liberating such energy in the form of an electric current into the welding circuit.

2. In combination with a percussive welding apparatus, means for storing up kinetic energy, and means for liberating such energy in the form of electric current into the welding circuit.

3. In combination with a percussive welding apparatus, means for storing up kinetic energy in a flywheel, and means for liberating such energy in the form of electric current into the welding circuit.

4. In combination with a percussive welding apparatus, means for storing up kinetic energy in a flywheel mounted on a motor, and means for liberating such energy in the form of electric current into the welding circuit.

5. In combination with a percussive welding apparatus, a flywheel mounted on the shaft of a motor, said motor being adapted to be alternately connected with a source of electrical energy and a transformer the primary winding of which is linked with a secondary winding, said secondary winding being connected to members to be welded.

6. In combination with a percussive welding apparatus, a motor having a separately excited shunt field winding and a series field winding, a source of electrical energy to actuate said motor, a flywheel mounted on the shaft of said motor, and means for discharging the kinetic energy of said flywheel through said series field to the primary of a transformer, the secondary winding of said transformer being connected to a pair of clamping members holding members to be welded.

In testimony whereof, I have hereunto subscribed my name this 15th day of February 1921.

CHARLES F. WAGNER.